July 21, 1953  G. L. MARTIN  2,645,922
RESTRAINING DEVICE
Filed June 28, 1950
FIG.1
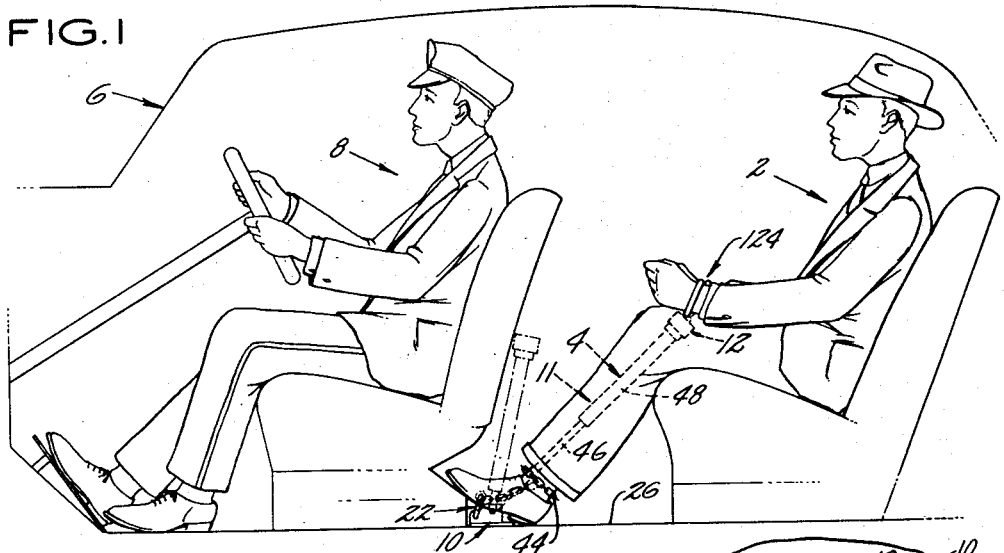
FIG.2
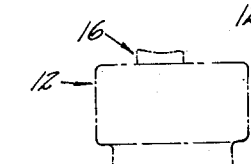
FIG.4 FIG.3 FIG.6 FIG.5 FIG.7
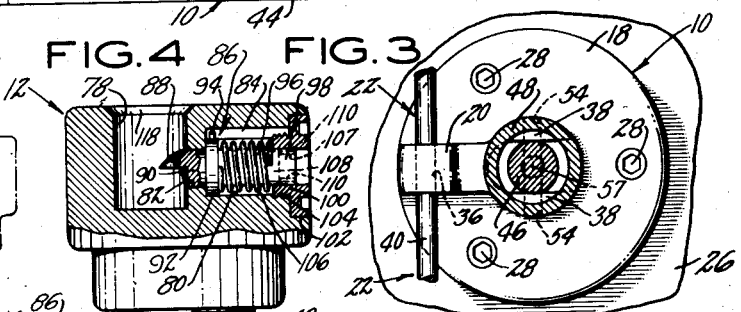
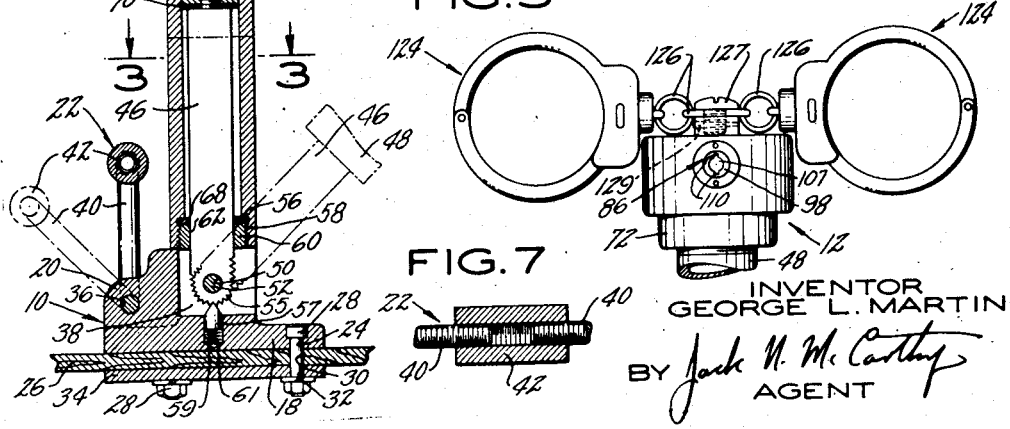
INVENTOR
GEORGE L. MARTIN
BY Jack N. McCarthy
AGENT Patented July 21, 1953

2,645,922

UNITED STATES PATENT OFFICE 2,645,922

RESTRAINING DEVICE

George L. Martin, Elmwood, Conn.

Application June 28, 1950, Serial No. 170,865

5 Claims. (Cl. 70—16)

This invention relates to restraining equipment particularly for use in the transportation of persons for which such restraint is necessary.

An object of this invention is to provide a device whereby a policeman, or controlling person, can transport one or more prisoners in a vehicle with safety and without fear of assault or escape of the prisoners.

Another object is to provide a restraining device which can be operated with ease in securing a person thereto.

A further object is that a prisoner having handcuffs equipped with a stud can be placed and restrained in any vehicle equipped with the holding part of the restraining device without changing handcuffs.

Another object is to provide a device which will permit a prisoner a limited amount of movement while holding him in a restrained position. Other objects and advantages will be apparent from the specification and from the accompanying drawings which illustrate the invention.

Fig. 1 is a view in side elevation of a vehicle which shows a prisoner restrained by a restraining device which is an embodiment of the invention disclosed herein.

Fig. 2 is an elevational view in section of the restraining device, the dot and dash lines showing how the device can be expanded and moved about its base.

Fig. 3 is a view taken along the line 3—3 of Fig. 2.

Fig. 4 is an enlarged view of the stud receiving head being partially broken away to reveal certain details of its construction.

Fig. 5 is a view showing a pair of handcuffs equipped with a stud held by the stud receiving head.

Fig. 6 is a view of a multiple head for use in the event more than one prisoner is to be restrained.

Fig. 7 is a view showing part of the leg shackle member and holding nut.

Referring to the figures in detail, in Fig. 1 a prisoner 2 is restrained by a restraining device 4 in a vehicle 6 of standard construction. As shown in this figure this device 4 prevents assault upon the driver 8 of the vehicle and escape from said vehicle.

The restraining device 4 consists of four main parts, a base 10, connecting means 11, a head 12 and a stud 16.

The base 10 consists of a base plate 18, a boss 20 and a leg shackle member 22. The base plate 18 is provided with bolt holes 24 fixedly mounting said base. Fig. 2 shows the base mounted on a vehicle floor 26 by bolts 28 through holes 24, holes 30 in the vehicle floor and holes 32 in a retaining plate 34. Boss 20 shown as integral with the base plate is formed with a hole 36 for attachment of the leg shackle member 22 and a bifurcated portion 38 for pivotally supporting the remainder of the device to be described later.

The leg shackle member 22 consists of an open ring 40 threaded on each end and a holding nut 42 for holding the open ring closed. As seen in Fig. 1 this member 22 holds a leg shackle 44 thereby restraining the feet of a prisoner.

The connecting means 11 is telescopic in nature having a tube member 48 fixedly attached to the head 12 with a limited amount of movement in relation to a rod member 46 pivotally connected to the base 10. Rod 46 has at its lower end a hole 50 therethrough for receiving pin 52 which is fixedly held in holes 54 of the bifurcated portion 38 of boss 20. This construction allows the pivoting motion shown in Figs. 1 and 2 by the two different angular positions. To resiliently hold the device at any particular position the bottom of the rod is rounded and has a ratchet 55 for engagement with a spring loaded detent 57 mounted in a bore 59 in base plate 18. The detent 57 is biased into engagement with the ratchet 55 by a spring 61 positioned in bore 59 below the detent 57.

Tube member 48 has a recess 56 on its lower end internally threaded to receive bushing 60 whose inner diameter 62 has a sliding engagement with rod 46. Rod 46 has a threaded portion 64 on its upper end for the attachment of a guide member 66 which has an internally threaded bore. While no specific means are shown fixedly attaching guide member 66 to rod 46, any means desired may be used such as a set screw or the peening over of threaded portion 64.

A resilient washer 68 in recess 56 is held therein by bushing 60 and a similar washer 70 over threaded portion 64 is held in place by guide member 66. These two washers 68 and 70 serve to cushion the blow when the telescoping members are extended to their fullest open position.

Head 12 is fixedly attached to the upper end of tube member 48. A lower necked down portion 72 on the head 12 is internally threaded at 74 to receive the upper part of tube member 48 which is externally threaded. A set screw 76 holds these members in fixed relation. The head member has two main openings therein, a stud receiving opening 78 and a lock receiving opening 80. These two openings are connected by a passage 82 for a purpose to be described later.

The lock receiving opening 80 has a key way 84 therein to prevent lock member 86 from turning therein. The lock member 86 is a member consisting of a stud engaging latch 88, a passage guide member 90, a guide and holding collar 92, a guide pin 94 extending from said collar, a spring guide 96 and a key receiving portion 98. A nut 100 having a circular head 102 and a bore 104 is threaded into the outer internally threaded end of the lock receiving opening 80 for holding said lock member in place. A spring 106 biases lock member 86 into locking position.

As shown in Fig. 4 the stud engaging latch 88 extends into the stud receiving opening 78 for engagement with stud 16 in a manner to be described later. The passage guide member 90 is slideably engaged in passage 82 and the guide and holding collar 92 is biased against the bottom of the lock receiving opening by the spring 106. The guide pin 94 extends upward into the keyway 84 and the spring guide 96 prevents the spring from bending. The key receiving portion 98 extends into bore 104 of nut 100.

The key receiving portion 98 consists of a bore 107 which opens into a bore 108 of a larger diameter. Bore 107 has two diametrically opposed key ways 110 extending into bore 108 to receive key projections 112 on key 114 (see Figs. 2, 4 and 5). Key projections 112 extend outward from the stem of the key a total distance greater than the diameter of bore 107 but slightly less than bore 108.

The key 114 serves to operate lock member 86 by the insertion of the projections 112 of the key 114 into the keyways 110 of the bore 107 and moving the projections into bore 108. The key is then turned to place the projections 112 behind the face formed at the meeting plane of bores 107 and 108. Movement of the key 114 away from the head moves the lock member thereby removing the stud engaging part 88 from the stud receiving opening 78 to place the head 12 in an unlocked position.

The stud 16 is formed to slideably engage the stud receiving opening 78 and to be held in a locked position by the stud engaging latch 88 of the lock member 84, until released by the key 114. A circular tapered portion 116 on the stud rests on the tapered edge 118 of the stud receiving opening 78. This tapered edge 118 serves another purpose and that is to guide the stud 16 into the opening by having the bottom of the stud rounded as at 120. A notch 122 formed around this stud is for engagement by the stud engaging latch 88 to hold the stud in the head. The notch is formed around the entire circumference of the stud to insure engagement of the latch 88 with the notch when the stud is placed in the opening 78.

The stud 16 can be fixedly attached to any device desired to be held by the restraining device. In Figs. 1 and 5 a pair of handcuffs 124 are shown attached to the stud 16. The handcuffs 124 are of the type having three links 126 between the wrist units. The stud 16 is fixedly attached to one of the links 126 by having a screw 127 pass through one of the links into a threaded hole in the top of the stud 16. A tapered pin 129 is fixed in a tapered hole through the stud 16 and screw 127 to prevent removal of the screw 127 from the stud. While only one fixing means is shown any type of means desired may be used.

Fig. 6 shows a multiple head unit 128 for use in the event only one base 10 and connecting means 11 is available. The unit consists of heads 130, a bar 132 and an attaching member 134.

The head 120 is similar to the head 12, the difference being in the attaching means. Head 130 has a threaded member 136 extending from the bottom to engage an internally threaded bore 138 in the bar 132. The bar 132 contains a number of these bores 138.

The attaching member 134 is formed of an externally threaded part 140 and an internally threaded part 142. Part 140 is threaded into an internally threaded bore 144 in bar 132 and fixed therein by a set screw 146. Part 142 is adapted to threadably engage the threaded portion 74 of the tube member 48 and be fixedly attached by a set screw 148.

*Operation*

In operation, an arresting officer 8 would place on his prisoner 2 a pair of handcuffs 124 having a stud 16 attached thereto. Now to transport his prisoner it is necessary to use a vehicle, said vehicle having the holding part of the restraining device 4 mounted therein on the floor 26 with the spring loaded detent holding the device in an upright position, out of the way, but easily accessible. It is to be understood that the device may be mounted anywhere desired.

The officer 8 seats his prisoner 2 in the vehicle holding the stud 16 and pulling tube member 48 up and towards the prisoner to place the head 12 under the stud 16. The stud is then inserted into the stud receiving opening 78, the round bottom 120 of the stud and tapered edge 118 of the opening 78 making it easier to place the stud into the opening.

The round bottom 120 of the stud as it moves toward the bottom of the opening 78 engages the stud engaging part 88 and moves it out of the opening against the action of spring 106, as the notch 122 comes opposite the stud engaging part 88 the spring 106 biases the part 88 into the notch to hold the stud 16 in the opening in locked position.

The prisoner is now restrained in the vehicle permitting the officer to perform other duties without fear of the prisoner assaulting him or escaping. The restraining device permits the prisoner a limited amount of freedom with the pivoting and telescopic action of the connecting means 11. In the event the prisoner has on leg shackles these may be fixed to the leg shackle member 22.

When the prisoner 2 is to be removed from the vehicle the key 114 is inserted into the key receiving portion 98, the projection 112 of the key passing along the keyways 110 of the bore 107 and into the bore 108. The key is then turned to place the projection 112 behind the face formed at the meeting plane of bore 107 and 108. The key is then pulled away from the head 12 thereby removing the stud engaging part 88 from the notch 122 of the stud and out of the stud receiving opening 78 to place the head 12 in an unlocked position. The stud 16 can now be removed from the head freeing the prisoner from the restraining device and making it possible for him to be moved away from said device.

Although a certain specific embodiment has been shown and described herein for purposes of illustration, it will be evident to those skilled in the art that the invention is capable of various modifications and adaptations within the scope of the appended claims.

I claim:

1. A restraining device comprising a pair of telescoping members, a base member at the free end of one member and a stud receiving head at the free end of the other member, a pair of handcuffs, a stud fixedly attached thereto for insertion into said head, said head being adapted to receive said stud and hold it in a locked position.

2. In a restraining device, a pair of handcuffs, a stud fixed to said pair of handcuffs for releasable attachment to a holding device, said stud having a circular notch therein to be engaged by a locking member, said stud also having a circular tapered portion adapted to position itself on a cooperating edge, said stud also having a member for fixedly holding it to said pair of handcuffs.

3. In a restraining device, a pair of handcuffs, a stud fixed to said pair of handcuffs, a stud receiving head for releasably holding said stud, said head having an opening to receive said stud and locking means to hold said stud in said head, a tubular member, said head being fixed to one end of said member, and a base, said member being attached to said base.

4. A restraining device having in combination, a pair of handcuffs, a stud fixed to said handcuffs, a head having an opening for receiving said stud, said head having a locking member for holding said stud in said opening, a tube member fixed to said head, a base, a rod member connected to said base, said tube member and rod member having a telescopic relation, a bushing on the free end of the tube member, said rod member passing through said bushing, a guide member on the free end of said rod member, said bushing and guide member limiting the telescopic movement between the tube member and rod member.

5. A restraining device having in combination, a pair of handcuffs, a stud fixed to said handcuffs, a head having an opening for receiving said stud, said head having a locking member for releasably holding said stud in said opening, a tube member fixed to said head, a base, a rod member pivotally attached to said base, means for holding said member at an angular position around its pivotal attachment, said tube member and rod member having a telescopic relation, a bushing on the free end of the tube member, said rod member passing through said bushing, a guide member on the free end of said rod member, said bushing and guide member limiting the telescopic movement between the tube member and rod member.

GEORGE L. MARTIN.

References Cited in the file of this patent

UNITED STATES PATENTS

| Number | Name | Date |
|---|---|---|
| 182,711 | Roth | Sept. 26, 1876 |
| 449,028 | Beilmann | Mar. 24, 1891 |
| 583,796 | Ferrell | June 1, 1897 |
| 1,654,752 | Raleigh | Jan. 3, 1928 |
| 1,744,984 | Page | Jan. 28, 1930 |
| 1,823,697 | Nenstiehl | Sept. 15, 1931 |
| 2,018,745 | Schlitz | Oct. 29, 1935 |
| 2,150,368 | Fitzgerald et al. | Mar. 14, 1939 |
| 2,453,967 | Browne | Nov. 16, 1948 |

FOREIGN PATENTS

| Number | Country | Date |
|---|---|---|
| 247,666 | Germany | June 1, 1912 |